(12) United States Patent
Bannon (10) Patent No.: US 9,399,522 B2
(45) Date of Patent: Jul. 26, 2016

(54) RAM AIR TURBINE ACTUATOR

(71) Applicant: Hamilton Sundstrand, Windsor Locks, CT (US)

(72) Inventor: David G. Bannon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 375 days.

(21) Appl. No.: 14/185,405

(22) Filed: Feb. 20, 2014

(65) Prior Publication Data

US 2015/0232195 A1  Aug. 20, 2015

(51) Int. Cl.
*F15B 15/26* (2006.01)
*B64D 41/00* (2006.01)

(52) U.S. Cl.
CPC .......... *B64D 41/007* (2013.01); *F15B 15/261* (2013.01); *F05D 2220/34* (2013.01)

(58) Field of Classification Search
CPC ... F15B 15/26; F15B 15/261; F15B 2015/268
See application file for complete search history.

(56) References Cited

U.S. PATENT DOCUMENTS

| | | | | |
|---|---|---|---|---|
| 3,584,544 | A | * | 6/1971 | Haberman ............ F15B 15/261 92/24 |
| 4,392,556 | A | * | 7/1983 | Deutsch ................ F15B 15/261 92/23 |
| 4,703,683 | A | * | 11/1987 | Sue ........................ F15B 15/261 92/24 |
| 4,740,122 | A | | 4/1988 | Glaser |
| 4,863,323 | A | | 9/1989 | Glaser |
| 4,991,796 | A | | 2/1991 | Peters et al. |
| 5,366,313 | A | | 11/1994 | LaBarre |
| 6,238,292 | B1 | | 5/2001 | Pelkey |
| 6,580,179 | B2 | | 6/2003 | Eccles et al. |
| 6,832,540 | B2 | | 12/2004 | Hart |
| 7,097,014 | B2 | | 8/2006 | Huang |
| 7,125,058 | B2 | | 10/2006 | Hawthorne |
| 7,416,392 | B2 | | 8/2008 | Russ |
| 7,610,828 | B2 | | 11/2009 | Wingett et al. |
| 7,707,924 | B2 | | 5/2010 | Yamanouchi et al. |
| 7,762,739 | B2 | | 7/2010 | Blanchard |
| 8,042,417 | B2 | | 10/2011 | Davies et al. |
| 8,070,094 | B2 | | 12/2011 | Collins |
| 8,123,161 | B1 | | 2/2012 | Collins |
| 8,251,606 | B2 | | 8/2012 | Blanchard |
| 8,397,737 | B2 | | 3/2013 | Evans et al. |
| 8,640,563 | B2 | * | 2/2014 | Lang .................... B64D 41/007 74/89.37 |
| 2012/0297924 | A1 | | 11/2012 | Lang et al. |
| 2012/0328436 | A1 | | 12/2012 | Soidel et al. |
| 2013/0330121 | A1 | | 12/2013 | Sasscer et al. |

* cited by examiner

*Primary Examiner* — Michael Leslie
(74) *Attorney, Agent, or Firm* — Kinney & Lange, P.A.

(57) ABSTRACT

A component for use in a ram air turbine actuator includes a lock bolt extending along a centerline with the lock bolt being axially movable between a stowed position and a deployed position and a plurality of rollers that are radially outward from the centerline and guided by the lock bolt. The component also includes a slider radially between at least a portion of the lock bolt and a piston rod with the slider being axially movable between a stop position and the deployed position and up-lock wedges supported by the piston rod. The actuator becomes locked in the stowed position when the lock bolt and slider move axially within the piston rod and a cylinder to position the rollers to push the up-lock wedges radially outward into an aperture and prevent the lock bolt, slider, and cylinder from axial movement.

15 Claims, 8 Drawing Sheets

RAM AIR TURBINE ACTUATOR

BACKGROUND

The disclosure relates to a ram air turbine deployment and stowing system, and more particularly, the disclosure relates to an actuator for the system.

A Ram Air Turbine (RAT) is a device for generating emergency supplemental power utilized on numerous aircraft to provide hydraulic and electrical power. The RAT is stowed in the aircraft structure and deployed into the air stream by an actuator. The actuator is attached to aircraft structure and to an arm on the strut of the RAT. On deployment, the deployment actuator forces the RAT to swing out of its stowed, or retracted, position in the aircraft and into the air stream. The air stream acts on the RAT blades to spin the turbine and governor assembly, which in turn operates an electrical generator and hydraulic pump providing power to the aircraft. When not needed, the actuator stows the RAT within the aircraft.

SUMMARY

In one aspect, an actuator for a RAT system includes a piston rod that is cylindrical in shape and centered about a centerline and a plurality of up-lock wedges supported by the piston rod and able to move radially. The actuator also includes a lock bolt that extends along the centerline radially within the piston rod with the lock bolt being axially movable within the piston rod between a stowed position and a deployed position and a plurality of rollers that are radially outward from the centerline and guided by the lock bolt. The actuator has a slider radially between at least a portion of the lock bolt that is adjacent to the rollers and the piston rod with the slider being axially movable between a stop position and the deployed position and the stop position being axially between the deployed position and the stowed position. The actuator also includes a cylinder radially outward from the piston rod with the cylinder being axially movable between the stowed position and a deployed position. The actuator becomes locked in the stowed position when lock bolt, slider, and cylinder move axially to position the rollers radially inward from the up-lock wedges so that the rollers push the up-lock wedges radially outward into an aperture adjacent to one end of the cylinder and prevent the lock bolt, slider, and cylinder from axial movement.

In another aspect, a component for use in an actuator in a RAT includes a piston, a cylinder, a lock bolt extending along a centerline with the lock bolt being axially movable along the centerline between a stowed position and a deployed position, and a plurality of rollers that are radially outward from the centerline and guided by the lock bolt. The component also includes a slider radially between at least a portion of the lock bolt and a piston rod with the slider being axially movable between a stop position and the deployed position and the stop position being axially between the deployed position and the stowed position and up-lock wedges supported by the piston rod. The lock bolt and slider are axially movable within the piston rod and the actuator becomes locked in the stowed position when the lock bolt and slider move axially within the piston rod and a cylinder to position the rollers to push the up-lock wedges radially outward into an aperture adjacent to one end of the cylinder and prevent the lock bolt, slider, and cylinder from axial movement.

DETAILED DESCRIPTION

Figure 1:
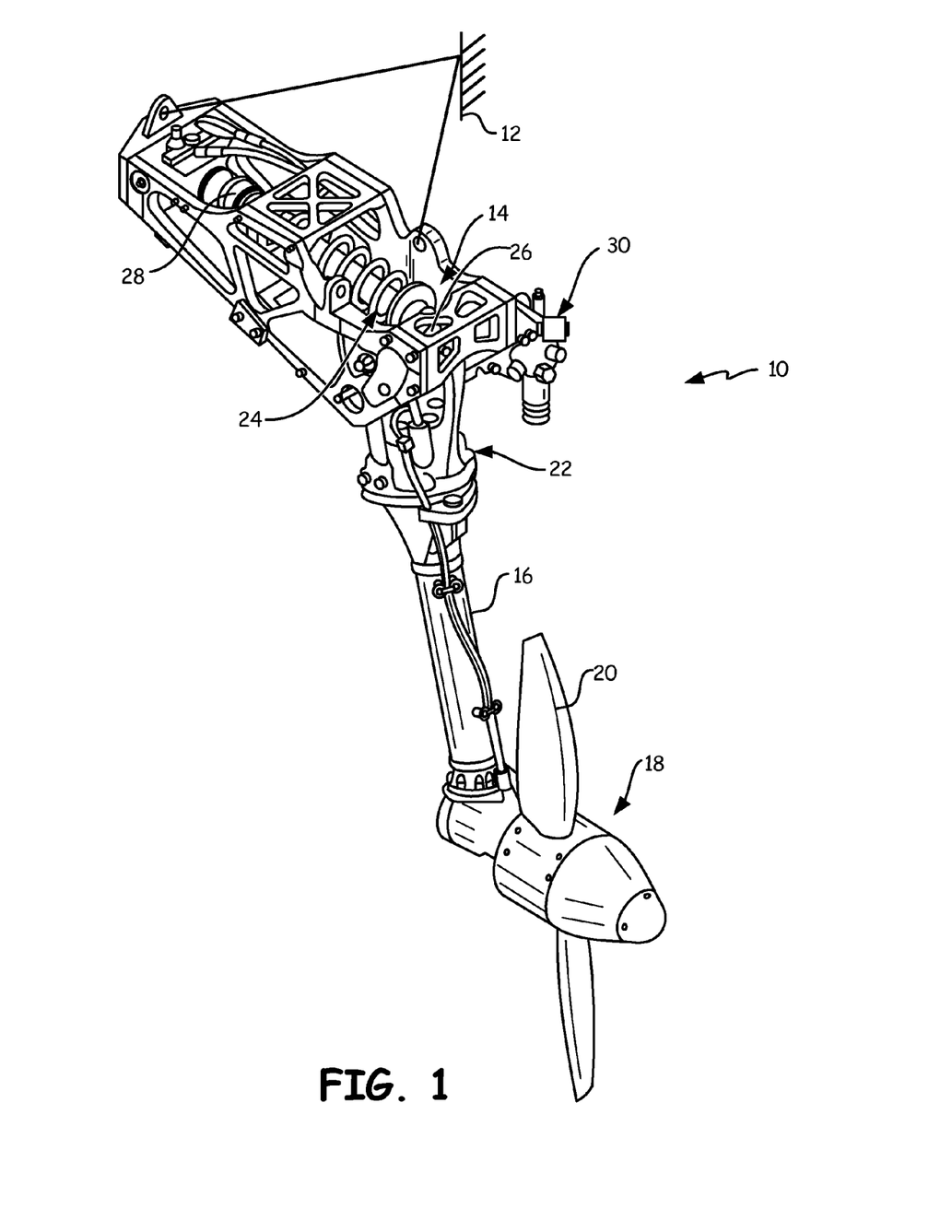
FIG. 1 is a perspective view of a RAT system in a deployed position.

FIG. 1 is a perspective view of RAT system 10 in a deployed position. RAT system 10 is secured to aircraft structure 12 by housing 14. Housing 14 pivotally supports strut 16 having turbine 18 at one end. Turbine 18 includes blades 20, which impart rotational drive to electric generator 22 and hydraulic pump 30. Actuator 24 is secured to strut 16 at first end 26 and to housing 14 at second end 28. Actuator 24, as shown in FIGS. 2A and 2B, is shown in its deployed position in FIG. 1.

Figure 2A:
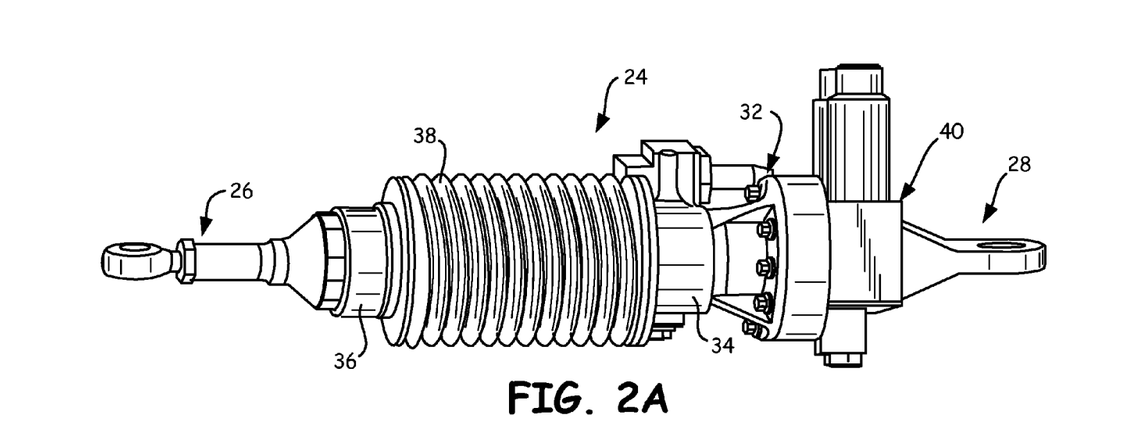
FIG. 2A is a perspective view of the actuator in FIG. 1 in a stowed position.
Figure 2B:
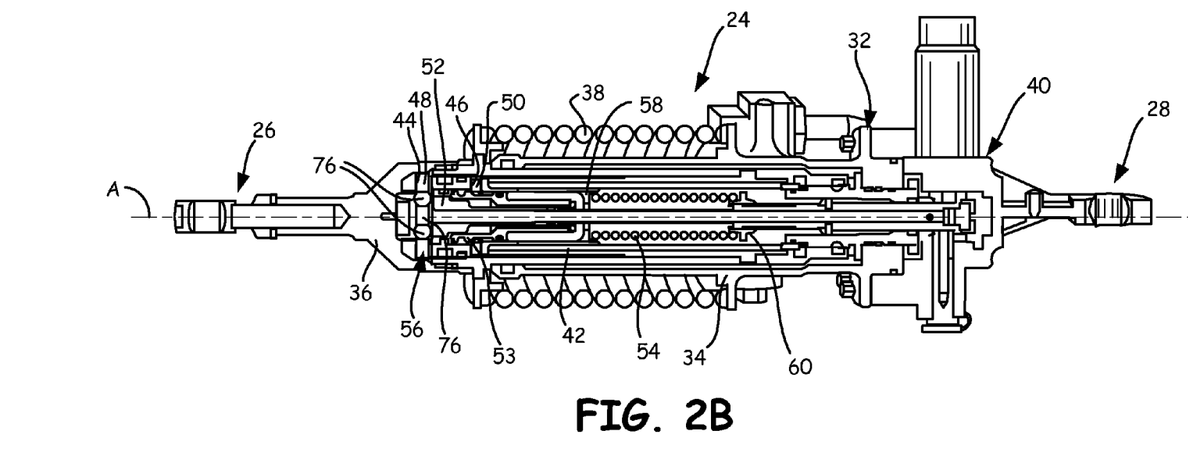
FIG. 2B is a cross-sectional view of the actuator in FIG. 1 in a stowed position.
Figure 2C:
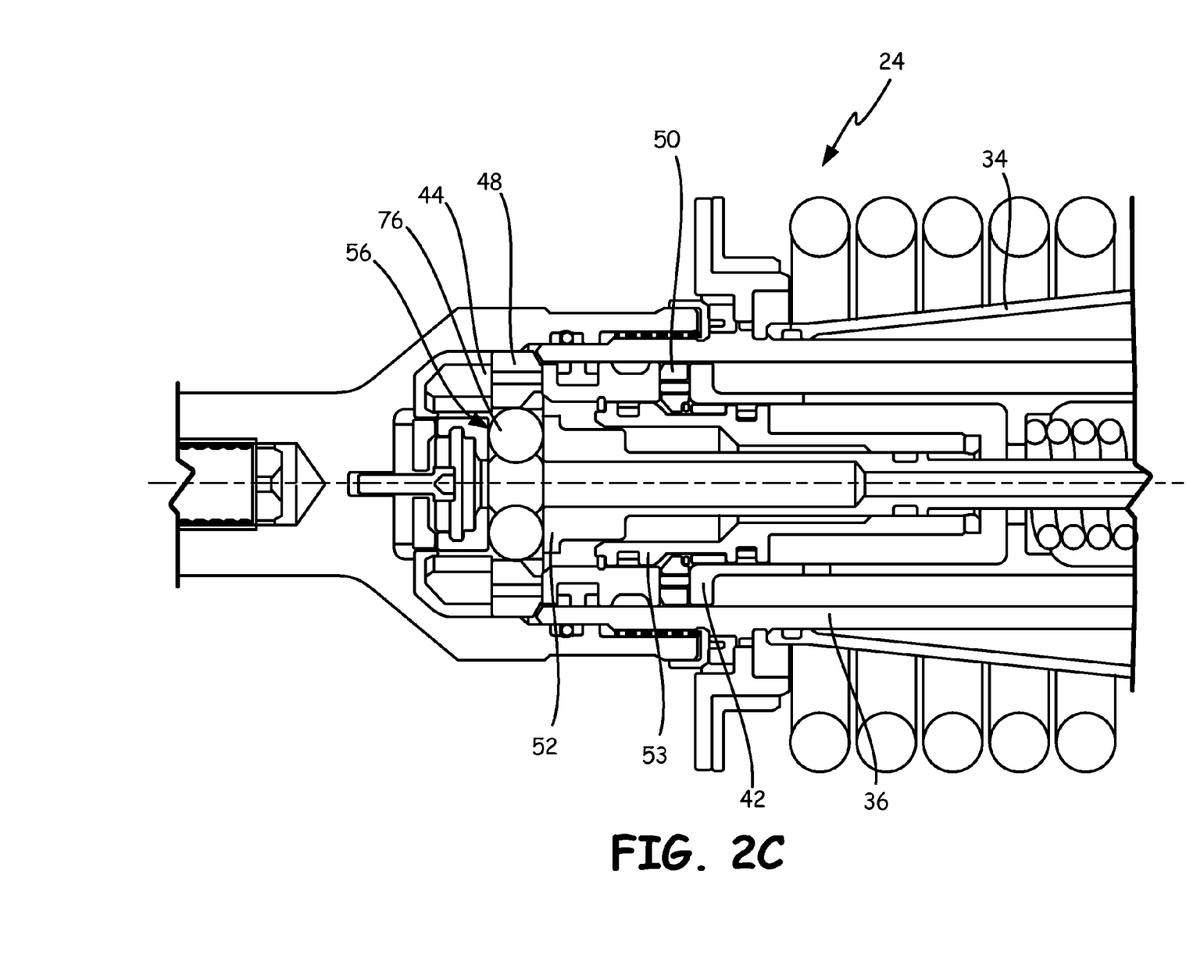
FIG. 2C is an enlarged view of the actuator in FIG. 1 in a stowed position.

FIG. 2A is a perspective view of actuator 24 in FIG. 1 in a stowed position, FIG. 2B is a cross-sectional view of actuator 24 in FIG. 1 in the stowed position, and FIG. 2C is an enlarged view of actuator 24 in FIG. 1 in the stowed position. Actuator 24 includes casing 32 having first cylinder 34 and second cylinder 36, which are unattached to casing 32 and telescopically arranged relative to one another. Deploy spring 38 is radially outward from and between the ends of first cylinder 34 and second cylinder 36 and is in a compressed state when actuator 24 is in a stowed position. Latch components 40 are located near second end 28 and work to actuate and initiate the deployment of RAT system 10 through the extension of actuator 24.

Second cylinder 36 is received within first cylinder 34 when actuator 24 is in the stowed position. Piston rod 42 is affixed to casing 32 such that piston rod 42 is rigidly attached to first cylinder 34 so that second cylinder 36 slides between and relative to piston rod 42 and first cylinder 34 when extending into a deployed position or retracting into a stowed position. Piston rod 42 does not move relative to first cylinder 34, and second cylinder 36 slides axially along the radially outer side of piston rod 42 when actuator 24 is being deployed or stowed. Piston rod 42 includes first aperture 44 and second aperture 46, which respectively receive up-lock wedges 48 and down-lock wedges 50. Up-lock wedges 48 and down-lock wedges 50 may be annular in shape or may be several wedges/pawls arranged circumferentially around piston rod 42.

Lock bolt 52 and slider 53 (which is radially outward from a portion of lock bolt 52) are arranged slideably within piston rod 42 and are configured to actuate up-lock wedges 48 to lock actuator 24 in the stowed position and actuate down-lock wedges 50 to lock actuator 24 in the deployed position. Piston rod 42 includes flange 58, which is spaced from collar 60. Lock bolt spring 54 is provided between and engages flange 58 and collar 60 to bias piston rod 42 and lock bolt 52 apart along centerline A.

Roller assembly 56 includes multiple rollers 76, which are guided by lock bolt 52 and arranged radially between lock bolt 52 and up-lock wedges 48 when actuator 24 is in a stowed position. When not in a stowed position, roller assembly 56 is radially between lock bolt 52 and piston rod 42. Rollers 76 are spaced circumferentially around the portion of lock bolt 52 that guides rollers 76 and may be cylindrical in shape.

In operation, to initiate deployment of RAT system 10, lock bolt 52 and slider 53 are allowed to move axially (to the right in FIGS. 2B and 2C) in response to the biasing force from lock bolt spring 54, which is free to act on lock bolt 52 and slider 53 due to the unlocking of latch components 40. Movement of roller assembly 56 (to the right in FIGS. 2B and 2C) permits up-lock wedges 48 to move radially inward and disengage from second cylinder 36, thereby enabling second cylinder 36 to move axially away from first cylinder 34 and piston rod 42 due to the force on second cylinder 36 caused by deploy spring 38. Deployed actuator 24 is shown in FIG. 3A.

Figure 3A:
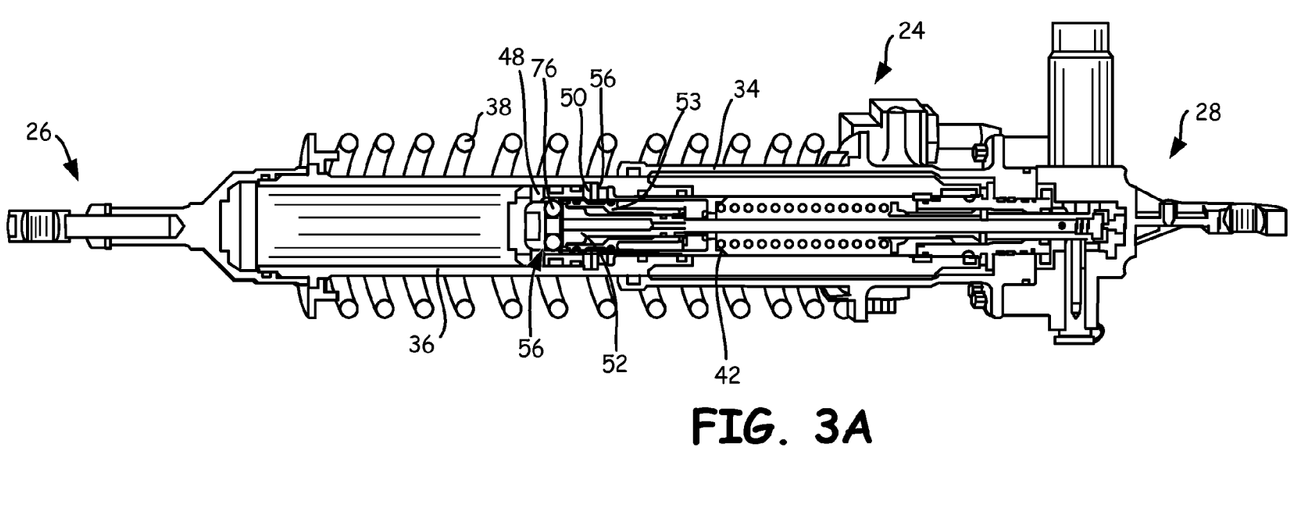
FIG. 3A is a cross-sectional view of the actuator in a deployed position.
Figure 3B:
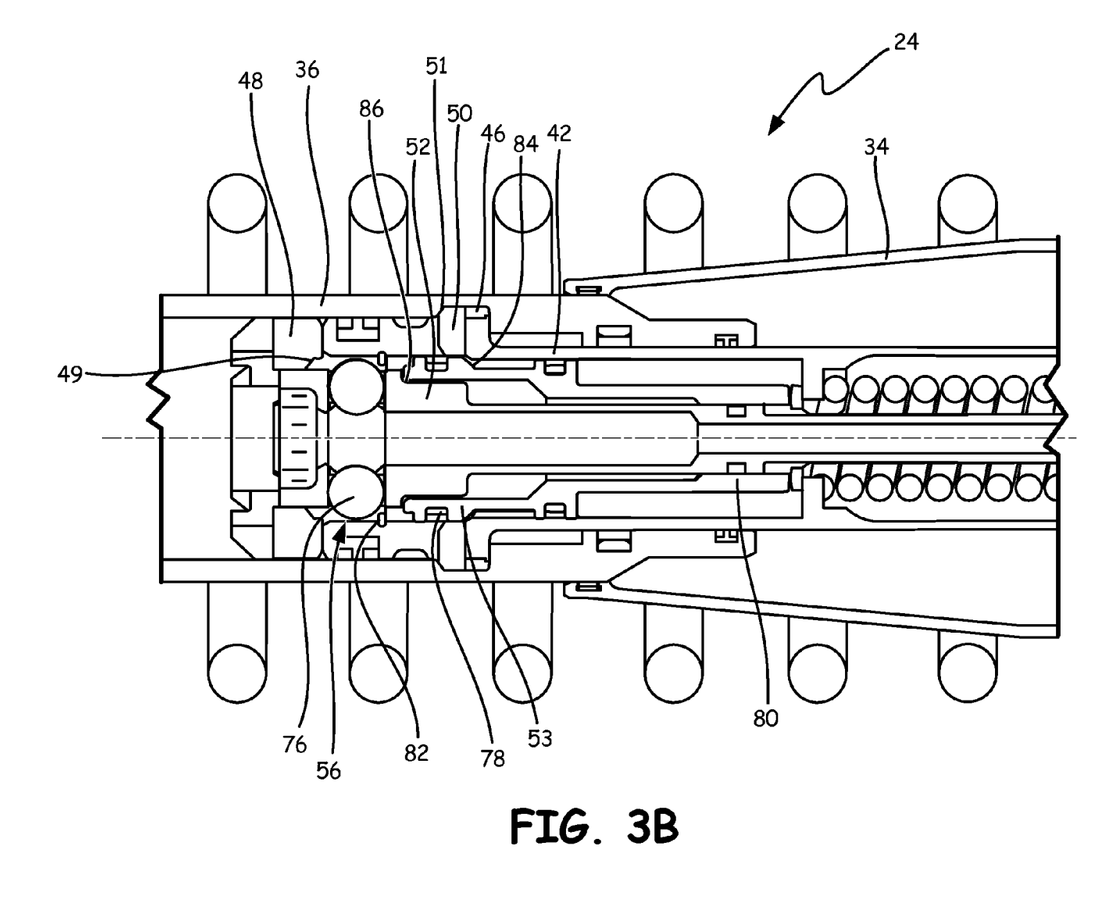
FIG. 3B is an enlarged view of the actuator in a deployed position.

FIG. 3A is a cross-sectional view of actuator 24 in a deployed position, while FIG. 3B is an enlarged view of actuator 24 in a deployed position. Actuator 24 includes (among the features discussed in FIGS. 2A, 2B, and 2C), first end 26 adjacent to second cylinder 36 and second end 28 adjacent to first cylinder 34. Actuator 24 also includes piston rod 42, which is stationary with respect to second end 28 and first cylinder 34. Radially outward from piston rod 42 is second cylinder 34, which moves axially along piston rod 42. Piston rod 42 includes first aperture 44 and second aperture 46, which respectively receive up-lock wedges 48 and down-lock wedges 50. Up-lock wedges 48 include, on the radially inner side, tapered inner surface 49.

Radially within piston rod 42 is slider 53, which is moveable within piston rod 42 and actuates down-lock wedges 50 to lock actuator 24 in the deployed position by pushing down-lock wedges 50 radially outward. Between piston rod 42 and slider 53 is as least one slider seal/first seal 78 (shown in FIG. 3B). First seal 78 is annular in shape and prevents fluid from moving between first end 26 and second end 28 through a gap between piston rod 42 and slider 53. Also between piston rod 42 and slider 53 is stop 82, which prevents slider 53 from contacting up-lock wedges 50 (discussed in greater detail with regards to FIGS. 4A, 4B, and 5). Radially within slider 53 is a portion of lock bolt 52, which is slideable within slider 53 and piston rod 42. Lock bolt 52 extends from second end 28 to roller assembly 56 and guides rollers 76. Between lock bolt 52 and slider 53 is at least one lock bolt seal/second seal 80. Second seal 80 is annular in shape and prevents fluid from moving between first end 26 and second end 28 through a gap between lock bolt 52 and slider 53.

As mentioned with regards to FIGS. 2A and 2B, deploy spring 38 causes second cylinder 36 to move axially away from first cylinder 34. Deploy spring 38 extends actuator 24 until second cylinder 36 is situated such that down-lock wedges 50 are radially within groove 51 in second cylinder 36. Groove 51 is near the end of second cylinder 36 that is adjacent to first cylinder 34. When deploy spring 38 has caused first cylinder 34 and second cylinder 36 to move until down-lock wedges 50 reach groove 51 in second cylinder 36, actuator 24 is in a deployed position.

After actuator 24 has reached a deployed position, actuator 24 is locked in place by down-lock wedges 50, which are pushed radially outward into groove 51 by tapered portion 84 of slider 53 as lock bolt 52 and slider 53 move axially away from first end 26 (to the right in FIGS. 3A and 3B). When locked in a deployed position, down-lock wedges 50 are on the radially outer side of second aperture 46 in groove 51 in second cylinder 36. Because down-lock wedges 50 are within groove 51, second cylinder 36 is prevented from axial movement and actuator 24 is locked in a deployed position.

Slider 53 is moved axially away from first end 26 during deployment through contact with stair-stepped portion 86 of lock bolt 52, which is configured to move slider 53 into a deployed position but does not move slider 53 into a stowed position. Rather, slider 53 is configured to move lock bolt 52 into a stowed position due to the contact between slider 53 and lock bolt 52 (as will be discussed with regards to FIGS. 4A, 4B, and 5).

Figure 4A:
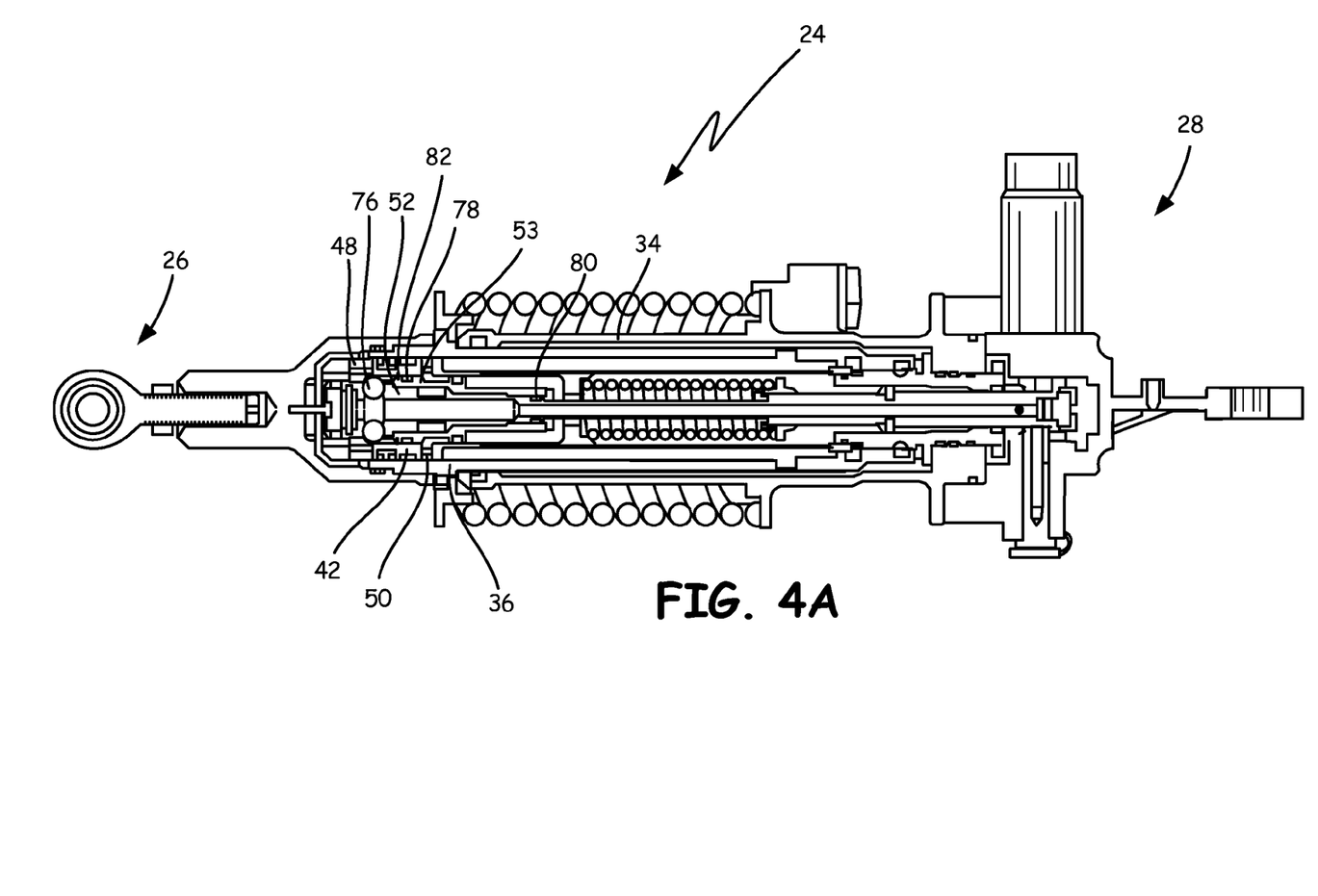
FIG. 4A is a cross-sectional view of the actuator in a nearly stowed position.
Figure 4B:
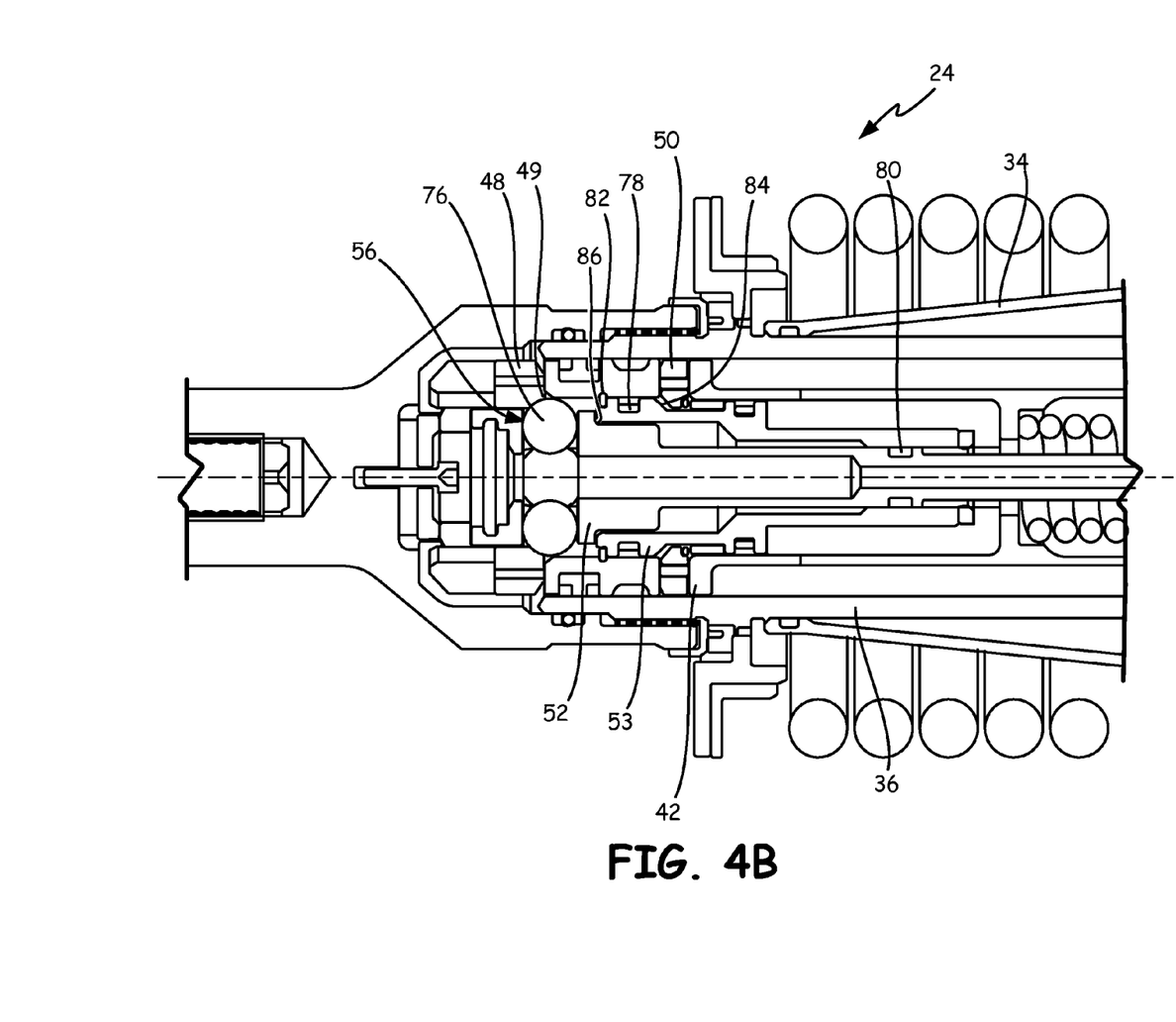
FIG. 4B is an enlarged view of the actuator in a nearly stowed position.

FIG. 4A is a cross-sectional view of actuator 24 in a nearly stowed position, while FIG. 4B is an enlarged view of actuator 24 in a nearly stowed position. To move actuator 24 into a stowed position from a deployed position, pressure is introduced into actuator 24. This pressure may be caused by a gas or other fluid being pumped into actuator 24. The pressure moves second cylinder 36 toward first cylinder 34 by causing a volume between piston rod 42 and second cylinder 36 to expand axially and push second cylinder 36 towards first cylinder 34 (to the right in FIGS. 4A and 4B). The pressure also moves lock bolt 52 and slider 53 in an opposite direction than the movement of second cylinder 36 by causing a volume within piston rod 42 to expand axially and push slider 53 (which in turn pushes lock bolt 52 due to stair-stepped portion 86 in lock bolt 52) toward first end 26. The pressure within actuator 24 pushes on first seal 78, causing slider 53 to move toward up-lock wedges 48 until slider 53 contacts stop 82 (located on piston rod 42), which prevents slider 53 from contact with up-lock wedges 48.

The pressure also pushes on second seal 80, causing lock bolt 52 to move toward up-lock wedges 48 and continue moving toward up-lock wedges 48 even after slider 53 has contacted stop 82. Eventually, the pressure causes rollers 76, which are supported by lock bolt 52, to push up-lock wedges 48 radially outward through contact with tapered inner surface 49 (see FIG. 5).

In the disclosed application, the contact between slider 53 and stop 82 (which prevents slider 53 from moving toward up-lock wedges 48) absorbs the excess force generated by the pressure on first seal 78 and reduces the force that moves lock bolt 52 and rollers 76 toward up-lock wedges 48. Therefore, the force that moves lock bolt 52 toward up-lock wedges 48 (after slider 53 has contacted stop 82) can only be applied to second seal 80. Second seal 80 may have a smaller area than the area of previous seals on lock bolt 52, which results in less force being applied to lock bolt 52 (because force is equal to pressure multiplied by area, so if area deceases than force decreases). The decrease in seal area causes a decrease in the contact force between rollers 76 and up-lock wedges 48 and reduces the damage on up-lock wedges 48 and/or rollers 76 caused by the excess force. The force acting on second seal 76 should be small enough so as to not damage up-lock wedges 48 and rollers 76 while being large enough to allow lock bolt 52 and rollers 76 to force the tapered up-lock wedges 48 radially outward and place actuator 24 in a stowed position (as shown in FIG. 5).

Figure 5:
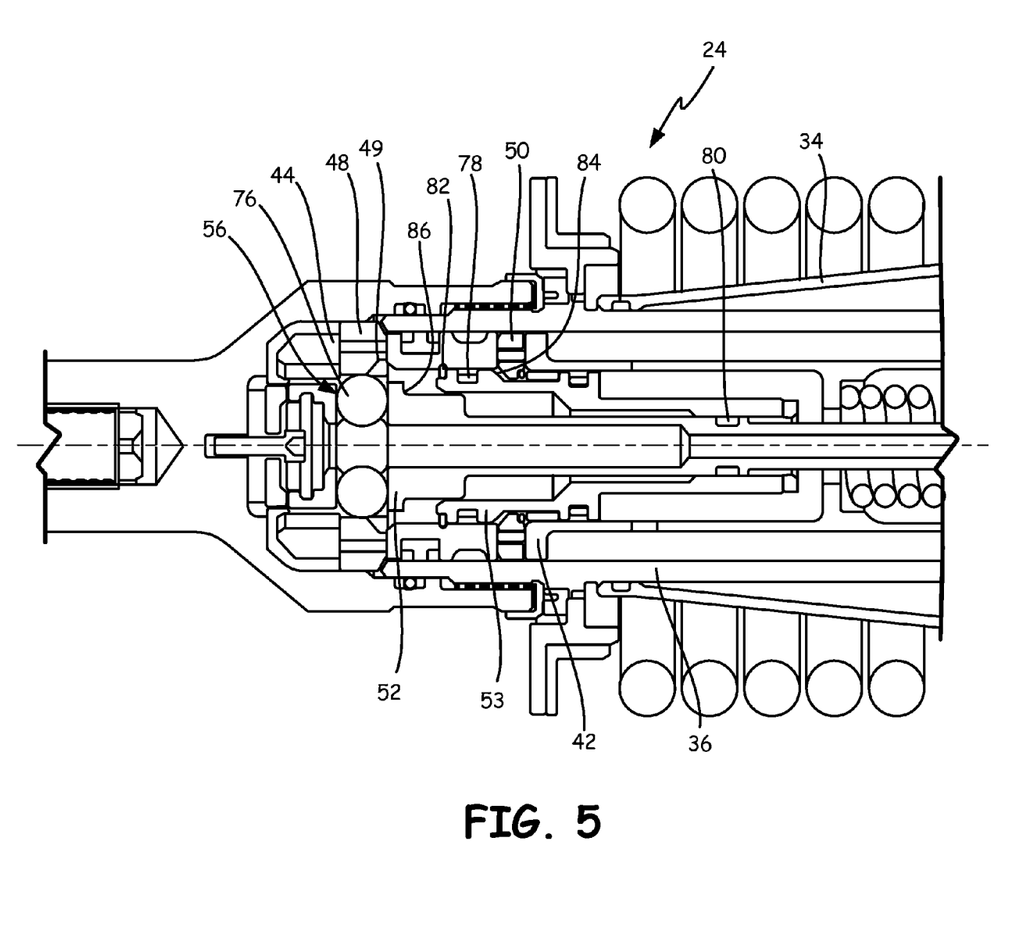
FIG. 5 is an enlarged view of the actuator in a stowed and locked position.

FIG. 5 is an enlarged view of actuator 24 in a stowed and locked position. Actuator 24 in FIG. 5 is completely retracted and is locked in place by up-lock wedges 48. When locked in a stowed position, up-lock wedges 48 are on the radially outer side of first aperture 44 adjacent to second cylinder 36 near first end 26. Because up-lock wedges 48 are adjacent to second cylinder 36 (up-lock wedges 48 are adjacent to the end of second cylinder 36 that is closest to first end 26), second cylinder 36 is prevented from axial movement away from first cylinder 34 and actuator 24 is locked in a stowed position. Up-lock wedges 48 are pushed radially outward into a stowed and locked position by rollers 76 (through contact with tapered inner surface 49) that are guided by lock bolt 52 at roller assembly 56. Lock bolt 52 positions rollers 76 to be in a stowed position by moving independently from slider 53 after slider 53 has contacted stop 82 (and is prevented from continued movement toward up-lock wedges 48).

As mentioned above, the configuration of lock bolt 52 and slider 53 reduces the damage to up-lock wedges 48 and rollers 76 due to the force used to stow actuator 24 caused by the pressure introduced into actuator 24. The reduction in damage extends the life of actuator 24 and reduces the need for maintenance. This configuration may be implemented in newly manufactured actuators or may be installed in actuators manufactured under previous designs.

Discussion of Possible Embodiments

The following are non-exclusive descriptions of possible embodiments of the present invention.

An actuator for a ram air turbine system may include a piston rod that is cylindrical in shape and centered about a centerline; a plurality of up-lock wedges supported by the piston rod and able to move radially; a lock bolt that extends along the centerline radially within the piston rod, the lock bolt being axially movable within the piston rod between a stowed position and a deployed position; a plurality of rollers that are radially outward from the centerline and guided by the lock bolt; a slider radially between at least a portion of the lock bolt that is adjacent to the rollers and the piston rod, the slider being axially movable between a stop position and the deployed position, the stop position being axially between the deployed position and the stowed position; a cylinder radially outward from the piston rod, the cylinder being axially movable between the stowed position and a deployed position, wherein the actuator becomes locked in the stowed position when lock bolt, slider, and cylinder move axially to position the rollers radially inward from the up-lock wedges so that the rollers push the up-lock wedges radially outward into an aperture adjacent to one end of the cylinder and prevent the lock bolt, slider, and cylinder from axial movement.

The actuator of the preceding paragraph can optionally include, additionally and/or alternatively, any one or more of the following features, configurations, and/or additional components:

A first annular seal located between the slider and the piston rod and a second annular seal located between the lock bolt and the slider.

Pressure applied to the first annular seal causes the slider and lock bolt to move axially until the slider is in the stop position.

Pressure applied to the second annular seal causes the lock bolt to move until the actuator becomes locked in the stowed position.

A stop located on the piston rod at the stop position near the up-lock wedges, the stop preventing the slider from movement towards the up-lock wedges but allowing the lock bolt to continue movement towards the up-lock wedges.

Pressure applied to the first annular seal and the second annular seal causes the slider and lock bolt to move until the slider contacts the stop and then causes only the lock bolt to move until the rollers are within the up-lock wedges.

An inner surface of the up-lock wedges is tapered.

The actuator is not locked in a stowed position when the rollers are not radially inward from the up-lock wedges.

A component for use in an actuator in a ram air turbine may include a piston; a cylinder; a lock bolt extending along a centerline, the lock bolt being axially movable along the centerline between a stowed position and a deployed position; a plurality of rollers that are radially outward from the centerline and guided by the lock bolt; a slider radially between at least a portion of the lock bolt and the piston rod, the slider being axially movable between a stop position and the deployed position, the stop position being axially between the deployed position and the stowed position; and up-lock wedges supported by the piston rod, wherein the lock bolt and slider are axially movable within the piston rod and the actuator becomes locked in the stowed position when the lock bolt and slider move axially within the piston rod and the cylinder to position the rollers to push the up-lock wedges radially outward into an aperture adjacent to one end of the cylinder and prevent the lock bolt, slider, and cylinder from axial movement.

The component of the preceding paragraph can optionally include, additionally and/or alternatively, any one or more of the following features, configurations, and/or additional components.

A first annular seal located radially outward from the slider and a second annular seal located between the lock bolt and the slider.

Pressure applied to the first annular seal causes the slider and lock bolt to move axially until the slider is in the stop position.

Pressure applied to the second annular seal causes the lock bolt to move until the actuator becomes locked in the stowed position.

A stop located at the stop position near the up-lock wedges, the stop preventing the slider from movement towards the up-lock wedges but allowing the lock bolt to continue movement towards the up-lock wedges.

Pressure applied to the first annular seal and the second annular seal causes the slider and lock bolt to move until the slider contacts the stop and then causes only the lock bolt to move until the rollers are within the up-lock wedges.

An inner surface of the up-lock wedges is tapered.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

I claim:

1. An actuator for a ram air turbine system comprising:
   a piston rod that is cylindrical in shape and centered about a centerline;
   a plurality of up-lock wedges supported by the piston rod and able to move radially;
   a lock bolt that extends along the centerline radially within the piston rod, the lock bolt being axially movable within the piston rod between a stowed position and a deployed position;
   a plurality of rollers that are radially outward from the centerline and guided by the lock bolt;
   a slider radially between at least a portion of the lock bolt that is adjacent to the rollers and the piston rod, the slider being axially movable between a stop position and the deployed position, the stop position being axially between the deployed position and the stowed position;
   a cylinder radially outward from the piston rod, the cylinder being axially movable between the stowed position and a deployed position, wherein the actuator becomes locked in the stowed position when lock bolt, slider, and cylinder move axially to position the rollers radially inward from the up-lock wedges so that the rollers push the up-lock wedges radially outward into an aperture adjacent to one end of the cylinder and prevent the lock bolt, slider, and cylinder from axial movement.

2. The actuator of claim 1, further comprising:
a first annular seal located between the slider and the piston rod; and
a second annular seal located between the lock bolt and the slider.

3. The actuator of claim 2, wherein pressure applied to the first annular seal causes the slider and lock bolt to move axially until the slider is in the stop position.

4. The actuator of claim 2, wherein pressure applied to the second annular seal causes the lock bolt to move until the actuator becomes locked in the stowed position.

5. The actuator of claim 2, further comprising:
a stop located on the piston rod at the stop position near the up-lock wedges, the stop preventing the slider from movement towards the up-lock wedges but allowing the lock bolt to continue movement towards the up-lock wedges.

6. The actuator of claim 5, wherein pressure applied to the first annular seal and the second annular seal causes the slider and lock bolt to move until the slider contacts the stop and then causes only the lock bolt to move until the rollers are within the up-lock wedges.

7. The actuator in claim 1, wherein an inner surface of the up-lock wedges is tapered.

8. The actuator of claim 1, wherein the actuator is not locked in a stowed position when the rollers are not radially inward from the up-lock wedges.

9. A component for use in an actuator in a ram air turbine comprising:
a piston rod;
a cylinder;
a lock bolt extending along a centerline, the lock bolt being axially movable along the centerline between a stowed position and a deployed position;
a plurality of rollers that are radially outward from the centerline and guided by the lock bolt;
a slider radially between at least a portion of the lock bolt and the piston rod, the slider being axially movable between a stop position and the deployed position, the stop position being axially between the deployed position and the stowed position; and
up-lock wedges supported by the piston rod,
wherein the lock bolt and slider are axially movable within the piston rod and the actuator becomes locked in the stowed position when the lock bolt and slider move axially within the piston rod and the cylinder to position the rollers to push the up-lock wedges radially outward into an aperture adjacent to one end of the cylinder and prevent the lock bolt, slider, and cylinder from axial movement.

10. The component of claim 9, further comprising:
a first annular seal located radially outward from the slider; and
a second annular seal located between the lock bolt and the slider.

11. The component of claim 10, wherein pressure applied to the first annular seal causes the slider and lock bolt to move axially until the slider is in the stop position.

12. The component of claim 10, wherein pressure applied to the second annular seal causes the lock bolt to move until the actuator becomes locked in the stowed position.

13. The component of claim 10, further comprising:
a stop located at the stop position near the up-lock wedges, the stop preventing the slider from movement towards the up-lock wedges but allowing the lock bolt to continue movement towards the up-lock wedges.

14. The component of claim 13, wherein pressure applied to the first annular seal and the second annular seal causes the slider and lock bolt to move until the slider contacts the stop and then causes only the lock bolt to move until the rollers are within the up-lock wedges.

15. The component in claim 9, wherein an inner surface of the up-lock wedges is tapered.

\* \* \* \* \*